(12) United States Patent
Wallero et al.

(10) Patent No.: US 10,807,203 B2
(45) Date of Patent: Oct. 20, 2020

(54) WELDING MATERIAL FOR WELD CLADDING

(71) Applicant: ESAB Sweden AB, Stockholm (SE)

(72) Inventors: Anders Wallero, Enskededalen (SE); Lars Orrberg, Sandviken (SE); Johan Lothman, Sandviken (SE); Mikael Johansson, Avesta (SE); Sven-Ake Fager, Gavle (SE)

(73) Assignee: ESAB SWEDEN AB, Stockholm (SE)

( * ) Notice: Subject to any disclaimer, the term of this patent is extended or adjusted under 35 U.S.C. 154(b) by 604 days.

(21) Appl. No.: 14/647,812

(22) PCT Filed: Nov. 26, 2013

(86) PCT No.: PCT/EP2013/074765
§ 371 (c)(1),
(2) Date: May 27, 2015

(87) PCT Pub. No.: WO2014/083009
PCT Pub. Date: Jun. 5, 2014

(65) Prior Publication Data
US 2015/0328724 A1 Nov. 19, 2015

(30) Foreign Application Priority Data
Nov. 28, 2012 (EP) .................... 12194640

(51) Int. Cl.
| | | |
|---|---|---|
| *C22C 38/18* | (2006.01) |
| *C22C 38/08* | (2006.01) |
| *C22C 38/58* | (2006.01) |
| *B23K 35/36* | (2006.01) |
| *C22C 38/02* | (2006.01) |
| *C22C 38/00* | (2006.01) |
| *C22C 38/04* | (2006.01) |
| *B23K 9/18* | (2006.01) |
| *B32B 15/01* | (2006.01) |
| *B23K 35/30* | (2006.01) |
| *C22C 38/42* | (2006.01) |
| *C22C 38/44* | (2006.01) |
| *C22C 38/52* | (2006.01) |
| *C22C 38/38* | (2006.01) |

(52) U.S. Cl.
CPC ........... *B23K 35/3607* (2013.01); *B23K 9/18* (2013.01); *B23K 35/3086* (2013.01); *B23K 35/3601* (2013.01); *B23K 35/361* (2013.01); *B32B 15/011* (2013.01); *C22C 38/001* (2013.01); *C22C 38/002* (2013.01); *C22C 38/02* (2013.01); *C22C 38/04* (2013.01); *C22C 38/38* (2013.01); *C22C 38/42* (2013.01); *C22C 38/44* (2013.01); *C22C 38/52* (2013.01); *C22C 38/58* (2013.01); *Y10T 428/12965* (2015.01)

(58) Field of Classification Search
CPC ....... C22C 38/001; C22C 38/52; C22C 38/04; C22C 38/02; C22C 38/38; C22C 38/42; C22C 38/44; C22C 38/002; C22C 38/58; Y10T 428/12965
See application file for complete search history.

(56) References Cited

U.S. PATENT DOCUMENTS

| | | | |
|---|---|---|---|
| 3,537,846 A | 11/1970 | Evert et al. | |
| 2003/0188813 A1* | 10/2003 | Hirasawa | C22C 38/001 148/609 |

FOREIGN PATENT DOCUMENTS

| | | | | |
|---|---|---|---|---|
| CN | 102695815 A | | 9/2012 | |
| JP | 59159295 A | * | 9/1984 | ......... B23K 35/3086 |
| JP | S59159295 A | | 9/1984 | |
| JP | S60121098 A | | 6/1985 | |
| JP | 2001009589 A | | 1/2001 | |
| JP | 2010188387 A | | 9/2010 | |
| RU | 2346797 C1 | | 2/2009 | |
| RU | 2443530 C1 | | 2/2012 | |
| WO | 2007037447 A1 | | 4/2007 | |

* cited by examiner

*Primary Examiner* — Karuna P Reddy
(74) *Attorney, Agent, or Firm* — Edell, Shapiro & Finnan, LLC

(57) ABSTRACT

An austenitic-ferritic stainless steel welding material, comprising in weight %: C: <0.02 Si: <0.45 Mn: 1.60-2.05 P: <0.03 S: <0.03 Cr: 18.5-25 Ni: 8.5-10.5 Mo: <0.75 10 Co: <0.2 Cu: <0.75 N: 0.12-0.3 the balance being Fe and incidental impurities.

4 Claims, No Drawings

WELDING MATERIAL FOR WELD CLADDING

RELATED APPLICATION DATA

This application is a § 371 National Stage Application of PCT International Application No. PCT/EP2013/074765 filed Nov. 26, 2012 claiming priority of EP Application No. 12194640.4, filed Nov. 28, 2012.

TECHNICAL FIELD

The present invention relates to an austenitic stainless steel welding material for producing a weld metal. The invention also relates to a welded article and a method for manufacturing a welded article.

BACKGROUND ART

Large components, such as nuclear reactor vessels, are typically manufactured in low- or non-alloyed carbon steel and provided with a layer of stainless steel in order to protect the component from corrosion. The layer of stainless steel is thereby applied to the vessel by so called weld cladding or overlay welding. During weld cladding of a surface, a welding material in the form of a stainless steel strip fused on the surface to be coated, by an electrical arc under a layer of molten flux. The molten welding material solidifies on the surface of the component and forms a weld clad. Typical welding methods for weld cladding includes Submerged Arc Welding (SAW) and Electro Slag Welding (ESW)

In recent development of reactor technology, the cladding is made part of the structural design of the reactor vessel and therefore further components, such as attachments for fuel bundles, are attached directly by welding onto the stainless steel cladding of the reactor vessel. One problem associated therewith is that conventional weld cladding materials used in reactor vessels do not have the sufficient strength to bear the load from the auxiliary components.

Various attempts have been made to improve the strength of welding claddings, for example by increasing the amount of carbon in the welding material. However, high amounts of carbon reduce the corrosion properties of the weld cladding.

Other work has been directed to solve manufacturing problems of welding materials. For example, U.S. Pat. No. 3,537,846 describes a stainless steel weld cladding strip in which the carbon content has been substituted with nitrogen. The resulting welding material has good hot workability properties, which makes it possible to manufacture welding strip with ease. However, a weld cladding produced from the steel material described in U.S. Pat. No. 3,537,846 does not have sufficient strength to be used in today's modern nuclear vessels.

WO2007037447 shows a welding material for weld joining zinc coated steel sheets. The welding material contains a high amount of chromium, 24-30 wt % and is optimized for preventing the melted zinc coating from contaminating the weld bead and cause liquid-metal embrittlement.

JP59159295 shows a welding material which is optimized for producing a weld bead having a ferrite content of 30-75 vol %.

Consequently, it is an object of the present invention to solve at least one of the aforementioned problems. In particular it is an object of the present invention to achieve an austenitic-ferritic stainless steel welding material from which weld claddings can be manufactured that has high strength and good corrosion resistance. A further object of the present invention is to achieve a welded component comprising a weld metal that has high strength and good corrosion resistance. Yet a further object of the present invention is to achieve a welding material which can be produced at low cost. Yet a further object of the present invention is to achieve a welding material that has high strength, good corrosion resistance and is suitable for use in nuclear vessels.

SUMMARY OF THE INVENTION

According to the invention, at least one of these objects is achieved by an austenitic-ferritic stainless steel welding material for producing a weld metal, comprising in weight %:

C: ≤0.02
Si: ≤0.45
Mn: 1.60-2.0
P: ≤0.03
S: ≤0.03
Cr: 18.5-25
Ni: 8.5-10.5
Mo: ≤0.75
Co: ≤0.2
Cu: ≤0.75
N: 0.12-0.3
the balance being Fe and incidental impurities, The inventive austenitic ferritic steel welding material produces a weld metal i.e. weld joints, or weld claddings, of high strength and good corrosion properties. Results from tests have surprisingly shown that tensile strengths of 563-575 MPa is achieved in weld claddings produced by the inventive welding material. This makes the inventive welding material very useful as cladding material in vessels in modern nuclear reactors.

The inventive welding material has been alloyed with nitrogen, which interstitially hardens the austenitic phase of the weld metal and thereby increases the strength of the weld metal. However, nitrogen is a strong austenite promoting element and high amounts thereof causes a predominantly austenitic structure in the inventive weld metal. It is important that the inventive weld metal has an austenitic structure, as austenite has very good corrosion properties. It is further advantageous to use austenitic steels in nuclear applications, since austenitic steels, in comparison to ferritic steels, are less sensitive to radiation induced stress corrosion. However, during solidification of austenitic steels, sulfur and phosphorous tend to concentrate to the liquid phase and causes sulfur and phosphorous rich streaks in the solidified material. During welding this mechanism could lead to the formation of hot cracks in the weld metal. Therefore, the inventive weld metal should comprise a pre-determined amount of ferrite. The ferritic phase has high solubility to phosphorous and sulfur. During solidification of the weld metal phosphorous and sulfur are therefore homogenously dissolved in the ferrite and hot cracks are avoided.

According to the invention, a sufficient amount of ferrite is achieved in the weld metal by balancing the amount of nickel, which is an austenite stabilizing element, and the amount of chromium, which promotes the formation of ferrite in the welding material, i.e. the welding strip. This results in a very good resistance to hot cracks in the weld metal.

However, In addition to the good resistance to hot cracking, it was surprisingly found that the inventive weld metal has a very high tensile strength.

It is believed that the surprisingly high tensile strength is caused by the balanced amounts of chromium and nickel which, in addition to ensuring a partly ferritic structure in the weld material, also contribute to increase the strength from the hardening effect that originates from nitrogen content. Generally, chromium increases the strength in steel whereas nickel is an element which generally improves ductility in steels. It is therefore believed that the high amounts of chromium in combination with the comparatively low amounts of nickel produce an additional strength increase in the inventive weld metall.

DEFINITIONS

In the present invention is by "welding material" meant a material, which is used for producing a weld, such as a weld cladding, by melting the "welding material" and letting it solidify on a surface. By "weld metal" is meant the material of the weld itself, i.e. the weld cladding or the weld bead.

BRIEF DESCRIPTION OF APPENDICES

Table 4: Chemical composition of the inventive welding material

Table 5: Chemical composition of the inventive weld material

DETAILED DESCRIPTION OF THE INVENTION

The austenitic-ferritic stainless steel welding material comprises the following elements:

Carbon (C) is an austenite stabilizing element. Due to the deliberate high amount of nitrogen in the inventive welding material it is important to keep all other austenite stabilizing elements low to ensure sufficient ferritic phase to avoid hot cracks in the weld metal. Carbon should therefore be present in as small amounts as possible in the inventive welding material. Carbon further produces chromium carbides which increase the risk for inter granular corrosion in the weld metal. In order to minimize unwanted formation of austenite and to secure good corrosion resistance in the weld metal carbon should be limited to 0.02 wt %, i.e. 0-0.02 wt % in the welding material.

Silicon (Si) is used to deoxidize the steel and small amounts of silicon are therefore unavoidable. However, high amounts of silicon could lead to hot cracking of the weld metal. Silicon should therefore be limited to maximum 0.45 wt % in the welding material.

Manganese (Mn) increases the solubility of nitrogen in the welding material which makes it possible to add high amounts of nitrogen to the welding material without the formation of nitrides or pores of nitrogen gas ($N_2$). Manganese further forms manganese sulfides which have a shape which is positive for decreasing the formation of hot cracks in the weld metal. Manganese should therefore be present in an amount of at least 1.60 wt % in the welding material. Manganese could cause deformation hardening in the welding material and should therefore be limited to a maximum of 2.0 weight %. Preferably, manganese is 1.70-1.90 weight %.

Phosphorous (P) and Sulfur (S) are typically included as impurities in the raw material for the welding material and could cause hot cracking in the weld metal if present in high amounts. Therefore, phosphorous should not exceed 0.03 wt % and sulfur should not exceed 0.04 wt %.

Chromium (Cr) is an important element in the inventive welding material since it provides corrosion resistance by the formation of a chromium oxide layer ($Cr_2O_3$) on the surface of the final weld metal. Chromium is further a ferrite promoting element and a high amount of chromium is therefore important to achieve a predetermined ferritic phase in the inventive weld metal. Chromium has also a positive effect on the strength of the inventive weld metal due to its solution hardening effect. Chromium should therefore be present in amounts of at least 18.5 wt % in the inventive welding material. However, high amounts of chromium could lead to precipitation of chromium rich nitrides which has a negative impact on impact toughness and pitting corrosion in the weld metal. Therefore chromium should be limited to 25 wt %, preferably chromium should be in the interval of 18.5-21.5 wt %, more preferred 20-21 wt %.

Nickel (Ni) is together with chromium the most important metallic alloying element in the inventive welding material. Nickel is an austenite stabilizing element and should therefore be present in low amounts in the inventive welding material in order to ensure a ferritic phase and to avoid hot cracks in the inventive weld metal. Nickel further increases the ductility. To achieve high strength in the inventive weld metal it is therefore important to keep the content of nickel low. Nickel is also a comparatively expensive alloy element and should for that reason be used in as small amount as possible. It is however important to include nickel in the inventive welding material since nickel improves the impact toughness of the weld metal and also improves corrosion by stabilizing $Cr_2O_3$. Nickel should therefore be present in an amount of 8.5-10.5 wt %, preferably 9-10 wt %.

Molybdenum (Mo) improves the corrosion resistance of the weld metal and has also a strong stabilizing effect on the ferrite phase. However, molybdenum may cause low ductility in the weld metal after post weld heat treatment (PWHT) due to formation of intermetallic phases. Further, molybdenum is an expensive alloying element and to achieve a cost effective welding material, the amounts of molybdenum should be low. Therefore, the amount of molybdenum in the welding material should be limited to a maximum of 0.75 wt %, preferably molybdenum is 0-0.75 wt %.

Cobalt (Co) is an undesirable element in nuclear reactor applications since cobalt under the influence of radiation transforms into radioactive isotopes. To avoid this and to meet international agreements on radiation safety cobalt is limited to 0.05 wt % in the inventive welding material, i.e. 0-0.05 wt %.

Copper (Cu) is typically present in the raw material for the inventive welding material and may be regarded an impurity. A high amount of copper has a negative effect on the weld metal since copper decreases the ductility of the weld metal and thereby reduces the impact strength. Copper further stabilizes the austenitic phase and high amounts of copper should therefore be avoided. Consequently, the amount of copper in the steel alloy should be limited to a maximum of 0.75 wt %, i.e. 0-0.75 wt %.

Nitrogen (N) is included in the inventive welding material in order to increase the strength of the weld metall. Nitrogen atoms are arranged interstitially in the austenitic structure of the inventive weld metal and produce thereby a solid solution hardening effect in the inventive weld metal. The amount of nitrogen should therefore be maximized in the inventive welding material in order to maximize the hardening effect and thereby the strength in the weld metal. However, high amounts of nitrogen may cause the precipitation of chromium nitrides which reduces the corrosion resistance of the weld metal. High amounts of nitrogen could also cause the formation of gas pores which reduces the impact toughness of the weld metal. The content of nitrogen in the inventive welding material should therefore be 0.12-0.3 wt %, preferably 0.12-0.20, or 0.12-0.18 or 0.14-0.18, more preferably, 0.12-0.16 wt or most preferable 0.12-0.14.

The amounts of the alloy elements should be balanced in the inventive welding material such that an austenitic structure with at least 5 vol % of ferritic phase is achieved in the solidified weld material. As mentioned above it is important that sufficient ferrite is present in the structure to prevent hot cracks but ferrite also increases the strength of the weld metal. However, the ferritic phase should not exceed 15 vol % since this could cause stress induced corrosion in radioactive environments. Therefore, the alloy elements in the inventive welding material should be balanced such that the amount of ferrite in a solidified weld metal, obtained by melting the inventive welding material, is 5-15 vol %. Preferably, the amount of ferritic phase is 8-12 vol %, more preferred 9-11 vol % since good resistance to weld cracking in combination with high strength and corrosion resistance thereby is achieved. The remaining phase is austenite.

It is obvious the welding material also exhibits essentially the same ratio of ferrite and austenitic phase, i.e. the welding material has also structure of 5-15 wt % ferrite and remainder austenite. Preferably, the amount of ferritic phase in the welding material is 8-12 vol %, more preferred 9-11 vol %

To achieve a desired amount of ferrite in the weld metal, the skilled person may balance the alloy elements in the inventive welding material on experimental basis. For example, the skilled person may manufacture a series of welding materials with different alloy compositions, apply the welding materials as welds and subsequently measure the ferrite content in the resulting weld metal. Based on the measurements, the skilled person may if necessary adjust the composition of the welding material further until a desired ferrite content is achieved.

According to one embodiment, the inventive welding material has the following composition (in weight %): C: 0.01-0.015; Si: 0.3-0.35; Mn: 1.60-2.0; P: 0-0.015; S: 0-0.001; Cr: 20.10-20.70; Ni: 9.20-9.40; N: 0.12-0.16.

According to one embodiment, the inventive welding material has the following composition (in weight %) C: 0.015; Si: 0.35; Mn: 1.80; P: 0.015; S: 0.001; Cr: 20.4; Ni: 9.40; N: 0.14.

In practice the inventive welding material is applied to the base surface by a welding method comprising the steps of melting the welding material under a layer of molten flux.

Suitable methods for welding the inventive welding material in the form of strip are for example: Submerged Arc Welding (SAW) or Electro Slag Welding (ESW). Suitable methods for welding the inventive welding material in the form of wire are for example: Submerged Arc Welding (SAW).

The resulting weld metal has a composition which is equal to the composition of the inventive welding material adjusted by the so called "alloying vector". Welding of the inventive welding material is performed under a bath of molten welding flux, i.e. mineral powder, in order to remove slag and to protect the molten welding material from oxidation. During welding an exchange of constituents takes place between the molten welding material and the molten welding flux. This has the effect that the composition of the final weld metal differs from the original welding material. The "alloying vector" is the influence that the welding flux has on the composition of the welding material when it is molten and transferred to the substrate.

The alloying vector differs between different welding fluxes since different fluxes have different chemical compositions and therefore affect the exchange between the molten slag and the molten welding metal differently. The alloying vector is typically given by the manufacturer of the flux but it may also be determined by analyzing and comparing the chemical composition of the final weld metal with the chemical composition of the original welding material.

According to one alternative, the inventive welding material is welded in combination with the commercially available a flux Sandvik 10SWQ. This flux has an alloying vector of approximately (in weight %):

C: 0; Si: 0.3; Mn: −0.8; P: 0.004; S: 0.002; Cr: 0; Ni: 0; Mo: 0; Co: 0; Cu: 0; N: 0.02

Hence, when an inventive welding material is welded under layer of molten Sandvik 10SWQ flux, an austenitic-ferritic stainless steel weld metal of the following composition is achieved (in weight %):

C: <0.02; Si: <0.75; Mn: 0.6-1.2; P: 0.034; S: 0.032; Cr: 18.5-25; Ni: 8.5-10.5; Mo: <0.75; Co: <0.20; Cu: <0.75; N: 0.14-0.32, the balance Fe and incidental impurities wherein the weld metal comprises 5-15 vol % ferrite and 85-95 vol % austenite.

Preferably the weld metal has a chromium content of 18.5-21.5 wt %. Preferably the nickel content is 9-10 wt %. Preferably the nitrogen content of the weld metal is 0.14-0.18 wt %.

The weld metal has a tensile strength of 550-600 MPa, preferably, 563-575 MPa.

The invention also relates to an article comprising a base layer and a weld metal that originates from the inventive welding material. The base layer could be any type of metal surface. For example, carbon steel or a low alloyed steel sheet or a non-alloyed steel sheet. The base layer could have any type of geometrical form, i.e. concave or convex or flat. Preferably, the base layer is a portion of the inside of a vessel for a nuclear reactor and is manufactured in low alloyed steel.

The weld metal could be a so called "weld cladding", i.e. one or several layers of weld metal applied onto the surface of the base layer. The weld cladding may cover only a portion of the base layer alternatively it may cover the entire base layer. It is also possible that the base layer consists of two or more separate elements that are welded together by a weld bead that is in contact with two adjacent edges of the base element.

The article may comprise an element that is attached to the cladding of weld metal. The element could be any type of structural component, e.g. a fitting or an attachment. However, in the case that the base layer is a portion of a vessel for a nuclear reactor, the element may be a beam. Typically, the element is welded to the cladding of inventive weld metal. In that case the element is welded with inventive welding material.

The welding material is typically in the form of a strip, which may be of any length and width. Typically, the strip has a width of 30-120 mm, for example 30, 60, 80, 90 or 120 mm. If large surfaces shall be covered, it is preferred to use a strip of large width since the surface may be cover in few passes. The welding material may also be in the form of wire, i.e. having a round cross-section. The wire may have any diameter, e.g. 1.2-2.4 mm. The advantage of using wire is that hard to reach places, such as the inside of a corner, may be covered with weld metal.

Measurement Methods

The amount of ferritic phase in the weld metal is determined by means of WRC-92. In this method the chemical composition of the weld metal is determined and then WRC-92 diagrams are used to determine the ferritic phase.

The chemical composition of the welding material or the weld metal may be analyzed by X-Ray Spectrometry or by wet chemical methods.

Test samples for ferrite determination and chemical composition and corrosion testing are prepared in the following way:

A sheet of carbon steel with a carbon content of max 0.25 wt % is provided. The sheet may have any dimensions. Weld metal is applied by melting the welding material in Submerged Arc Welding under a layer of molten flux of the type Sandvik 10SWQ or other suitable flux. The weld deposit applied should have a height of at least 16 mm, measured from the surface of the steel plate in order to ensure that the steel surface does not contaminate the weld metal in top portion of the weld deposit.

A slice of the weld deposit is cut from the top of the weld deposit parallel with the surface of the steel sheet, the slice should have a maximum thickness of 7 mm.

A sample is taken from the slice of weld metal and used for analyzing the chemical composition of the steel by X-ray spectrometry. The chemical composition of the weld sample may thereafter be used to determine the ferrite content of the sample by using WRC-92 diagrams.

Corrosion testing may be performed by the Strauss method (ASTM-A262 method E) The samples are thereby boiled in a solution of 6% copper sulphate and 16% sulphuric acid with metallic copper. The sample is boiled for a test time of 24 hours. The samples are thereafter bent over a bending angle of 180° and prepared for light microscopy, i.e. grinded and etched. The samples are thereafter examined visually in a light microscope for cracks originating from intergranular corrosion attacks. If no cracks are visible the samples are deemed to fulfill the requirements for corrosion resistance. The samples may be subjected to "sensitation" prior to boiling In order to trigger precipitation of chromium carbides. Sensitation is performed by heating the samples to a temperature of 675° C.+5° C. for 1 hour and then letting the samples cool in air.

EXAMPLES

The inventive welding material is further described by the following non-limiting examples:

In a first example, an inventive welding material (INV1) and a comparative welding material (CP1) were prepared by conventional steel making methods. The composition of the respective welding material is shown, in weight %, in table 1:

TABLE 1

| Composition of welding materials | | | | | | | | | | | |
|---|---|---|---|---|---|---|---|---|---|---|---|
|  | C | Si | Mn | P | S | Cr | Ni | Mo | Co | Cu | N |
| INV1 | 0.014 | 0.40 | 1.75 | 0.012 | <0.0005 | 20.41 | 9.28 | 0.12 | 0.027 | 0.047 | 0.14 |
| CP1 | 0.008 | 0.33 | 1.7 | 0.013 | <0.001 | 20.64 | 10.28 | 0.03 | 0.021 | 0.028 | 0.067 |

The conventional steel making methods by which the welding materials were manufactured included:

Melting of raw material in an electric arc furnace—refining in an AOD converter—casting into ingots—hot rolling—cold rolling into strip and finally slitting the strip into the dimensions 60×0.4 mm.

Strips of each respective welding material were subsequently applied as a weld cladding onto separate sheets of carbon steel type SA508 Gr 1. Material INV and CP1 was applied on two separate surfaces.

The claddings were applied by Submerged Arc Welding in a welding machine of the type ESAB 1600 LAF power source. The cladding of INV was fused under a layer of molten flux of the type Sandvik 10SWQ which has a composition of 24% SiO2, 30% Al2O3, 25% CaO+MgO and 12% F. The cladding of CP1 was fused under a layer of molten flux of the type Sandvik 10SWC, which is similar to Sandvik 10SWQ.

Three layers of weld metal were applied on each steel substrate. The layers were approximately 5.5 mm thick and were applied on top of each other. The weld claddings on the first surface was left in as welded condition and the weld claddings on the second surface was subjected to post weld heat treatment (PWHT) by heating the cladding at a temperature of 610° C. for a time period of 40 hours. Two test strips were cut out from uppermost layer of the weld claddings on each steel substrate. The test strips were cut parallel to the surface of the base layer.

Samples for measurement of chemical composition were taken from the test strips.

The composition of the weld metal from INV1 and CP1 and was determined by X-ray spectroscopy and wet chemical methods. The weld metals had the following composition:

TABLE 2

Composition of weld metals

|      | C     | Si   | Mn   | P     | S      | Cr    | Ni    | Mo   | Cu    | N     |
|------|-------|------|------|-------|--------|-------|-------|------|-------|-------|
| INV1 | 0.019 | 0.63 | 1.07 | 0.015 | <0.003 | 20.31 | 9.36  | 0.12 | 0.048 | 0.18  |
| CP1  | 0.008 | 0.33 | 1.7  | 0.013 | <0.001 | 20.64 | 10.28 | 0.03 | 0.028 | 0.067 |

Based on the chemical composition of the weld metal, the ferrite content of each test strip INV1 and CP1 was determined by WRC-92 diagrams. The inventive weld metal clad INV1 had a ferrite content of 12%, remainder austenite. The comparative weld metal CP1 had a ferrite content of 8.6%

Test bars for tensile testing were also manufactured from the test strips of each weld metal INV, CP1. The test bars had the dimensions 12.50×50 mm in accordance with tensile testing standard AWS B4.0. Four test bars were manufactured from the inventive weld metal and the comparative weld metal, respectively. Test bars were denominated INV1.1-INV1.4 and CP1.1-CP1.4.

The test bars, were subjected to tensile testing according to standard AWS B4.0 at room temperature (20° C.). The parameters maximal tension (RM) and elongation (%) were determined.

The following results were achieved in the tensile testing:

TABLE 3

Results from tension testing

| Test bars | Condition | Rm (MPa) | Elongation(%) |
|-----------|-----------|----------|---------------|
| INV1.1    | As welded | 563      | 46            |
| INV1.2    | As welded | 575      | 47            |
| INV1.3    | PWHT      | 557      | 49            |
| INV1.4    | PWHT      | 573      | 50            |
| CP1.1     | As welded | 505      | 51            |
| CP1.2     | As welded | 504      | 50            |
| CP1.3     | PWHT      | 506      | 51            |
| CP1.4     | PWHT      | 508      | 54            |

It is evident from table 3 that the inventive material INV1 exhibits higher tensile in comparison to the conventional material CP1. The high tensile strength of the inventive weld metal is a good measure on its strength and its ability to support components that have been attached to a weld cladding made from the inventive welding material. The tensile strength inventive weld cladding is sufficient for use as cladding material in modern nuclear vessels. From the tension tests it can also be concluded that the inventive welding metal has high tensile strength after post welding heat treatment (PWHT). This is an important characteristic since components in nuclear reactors often are subjected to heat treatment after weld cladding in order to relieve stress in the low alloy- or carbon steel substrate to which the weld cladding is applied.

In a second example, a further test series was performed with samples of inventive welding material. In this example six inventive welding materials (INV2-INV7) were produced and applied as weld metal by Submerged Arc Welding as described under the first example. The compositions of the welding materials and the resulting weld metals were analyzed as described under the first example and the amount of ferrite was determined in the weld metals by using WRC-92 diagrams. The compositions of the respective welding materials and weld metals as well as the amount of ferrite in the weld metal are shown in tables 4 and 5. As can be seen in tables 4 and 5, the dimensions of the strips of welding material and weld metal differs from the first example. The reason for this is that the strips of welding material for INV2-INV7 were produced in commercially available dimensions. This difference was deemed to have no influence on the properties of the final weld metal. The ferrite content in the test samples varied from 7-12 vol %. Highest amount of ferrite was measured in samples INV2 and INV7, 11 and 12 respectively. The lowest amounts of ferrite were measured in samples INV3 and INV5, which had a ferrite content of 7 vol %. The reason for the variation in ferrite content depends on the variations in chemical composition of the samples, Samples of weld metal from INV2-INV7 were subjected to mechanical testing according to standard AWS B4.0 at room temperature (20° C.). The parameters maximal tension (RM) and elongation (%) were determined. In addition thereto, samples taken from the weld metal INV2-INV7 were subjected to corrosion testing according to the Strauss method (ASTM-A262, procedure E) including sensitation. Table 6 shows the results from mechanical and corrosion testing.

TABLE 6

Results from mechanical and corrosion testing of samples INV2-INV7

| Sample | Dim (mm)   | Condition | Rm (N/mm2) | A (%) | Intergranular cracking |
|--------|------------|-----------|------------|-------|------------------------|
| INV2   | 50 × 0.4   | As welded | 571        | 50    | No                     |
| INV3   | 19 × 0.4   | As welded | 615        | 46    | No                     |
| INV4   | 37.5 × 0.4 | As welded | 594        | 43    | No                     |
| INV2   | 50 × 0.4   | PWHT A    | 613        | 43    | No                     |
| INV3   | 19 × 0.4   | PWHT A    | 612        | 37    | No                     |
| INV4   | 37.5 × 0.4 | PWHT A    | 585        | 51    | No                     |
| INV2   | 50 × 0.4   | PWHT B    | 578        | 48    | No                     |
| INV3   | 19 × 0.4   | PWHT B    | 611        | 46    | No                     |
| INV4   | 37.5 × 0.4 | PWHT B    | 594        | 49    | No                     |
| INV5   | 50 × 0.4   | As welded | 565        | 54    | No                     |
| INV6   | 19 × 0.4   | As welded | 589        | 46    | No                     |
| INV7   | 37.5 × 0.4 | As welded | 574        | 48    | No                     |
| INV5   | 50 × 0.4   | PWHT A    | 582        | 49    | No                     |
| INV6   | 19 × 0.4   | PWHT A    | 608        | 47    | No                     |
| INV7   | 37.5 × 0.4 | PWHT A    | 595        | 47    | No                     |
| INV5   | 50 × 0.4   | PWHT B    | 575        | 47    | No                     |
| INV6   | 19 × 0.4   | PWHT B    | 607        | 41    | No                     |
| INV7   | 37.5 × 0.4 | PWHT B    | 582        | 46    | No                     |

As can be seen in table 6, all inventive samples INV2-INV 7 exhibit very high tensile strength both in as welded condition and after post welding heat treatment. The measured values regarding mechanical properties are in line with the values of the first test. Regarding the corrosion resistance, none of the samples INV 2-INV 7 showed any signs of intergranular cracking in the Strauss test. It can therefore be concluded that the inventive welding material produces a weld metal with high mechanical strength and good corrosion resistance. Post welding heat treatment (PWHT) was performed at 595-620° C. The samples marked PWHT A were heat treated for 16 hours. The samples marked PWHT B were heat treated for 40 hours. The results show that the mechanical properties are equally high for PWHT A and PWHT B treated samples. This is positive since the PWHT B often is used in nuclear reactors whereas PWHT A may be used in other applications.

TABLE 4

Chemical composition of inventive welding materials

| Sample | Dim | C | Si | Mn | P | S | Cr | Ni | Mo | Co | N | Cu | Fe |
|---|---|---|---|---|---|---|---|---|---|---|---|---|---|
| INV2 | 50 × 0.40 | 0.02 | 0.43 | 2 | 0.011 | <0.001 | 20.7 | 9.4 | 0.09 | 0.02 | 0.15 | 0.03 | 67.9 |
| INV3 | 19 × 0.40 | 0.016 | 0.4 | 1.7 | 0.012 | <0.001 | 20.3 | 9.3 | 0.12 | 0.03 | 0.14 | 0.04 | 67.9 |
| INV4 | 37.5 × 0.40 | 0.018 | 0.39 | 1.7 | 0.012 | <0.001 | 20.4 | 9.2 | 0.12 | 0.03 | 0.14 | 0.05 | 67.8 |
| INV5 | 50 × 0.40 | 0.017 | 0.39 | 1.7 | 0.012 | <0.001 | 20.4 | 9.2 | 0.12 | 0.03 | 0.14 | 0.05 | 67.8 |
| INV6 | 19 × 0.40 | 0.017 | 0.4 | 1.8 | 0.012 | <0.001 | 20.4 | 9.3 | 0.12 | 0.03 | 0.14 | 0.05 | 67.8 |
| INV7 | 37.5 × 0.40 | 0.017 | 0.4 | 1.8 | 0.013 | <0.001 | 20.5 | 9.4 | 0.12 | 0.03 | 0.14 | 0.05 | 67.5 |

TABLE 5

Chemical composition of inventive weld metal

| Sample | Dim | C | Si | Mn | P | S | Cr | Ni | Mo | Co | N | Cu | Fe | Ferrite |
|---|---|---|---|---|---|---|---|---|---|---|---|---|---|---|
| INV2 | 50 × 0.40 | 0.02 | 0.77 | 1.2 | 0.015 | 0.002 | 20.8 | 9.2 | 0.08 | 0.02 | 0.14 | 0.03 | 67.7 | 11 |
| INV3 | 19 × 0.40 | 0.019 | 0.75 | 1.1 | 0.016 | 0.001 | 20.7 | 9.3 | 0.12 | 0.03 | 0.17 | 0.05 | 67.7 | 7 |
| INV4 | 37.5 × 0.40 | 0.018 | 0.75 | 1.1 | 0.016 | 0.001 | 20.8 | 9.3 | 0.12 | 0.03 | 0.17 | 0.05 | 67.6 | 8 |
| INV5 | 50 × 0.40 | 0.018 | 0.76 | 1.1 | 0.015 | 0.001 | 20.7 | 9.3 | 0.12 | 0.03 | 0.18 | 0.04 | 67.7 | 7 |
| INV6 | 19 × 0.40 | 0.015 | 0.75 | 1.1 | 0.015 | 0.002 | 20.6 | 9.2 | 0.12 | 0.03 | 0.17 | 0.04 | 67.9 | 8 |
| INV7 | 37.5 × 0.40 | 0.017 | 0.76 | 1 | 0.015 | 0.002 | 20.7 | 9.2 | 0.12 | 0.03 | 0.13 | 0.05 | 67.9 | 12 |

The invention claimed is:

1. An austenitic-ferritic stainless steel welding material for producing a weld metal, containing in weight %:
C: no greater than 0.02
Si: no greater than 0.45
Mn: 1.60-1.90
P: no greater than 0.03
S: no greater than 0.03
Cr: 18.5-21.5
Ni: 8.5-10.5
Mo no greater than 0.75
Co: no greater than 0.2
Cu: no greater than 0.75
N: 0.12-0.3
the balance being Fe and incidental impurities, wherein Mo is present in the austenitic-ferritic stainless steel welding material, and the austenitic-ferritic stainless steel welding material has a structure of 5-15 vol % ferrite and remainder austenite.

2. The welding material according to claim 1, wherein the amount of Cr is 20-21 weight %.

3. The welding material according to claim 1, wherein the amount of Ni is 9-10 weight %.

4. The welding material according to claim 1, wherein the amount of N is 0.12-0.14 weight %.

* * * * *